(12) United States Patent
Bacallao

(10) Patent No.: US 10,448,761 B2
(45) Date of Patent: Oct. 22, 2019

(54) SELF-CHECKOUT STATION AIR CIRCULATION

(71) Applicant: Walmart Apollo, LLC, Bentonville, AR (US)

(72) Inventor: Yurgis Mauro Bacallao, Centerton, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 220 days.

(21) Appl. No.: 15/677,143

(22) Filed: Aug. 15, 2017

(65) Prior Publication Data

US 2018/0049565 A1 Feb. 22, 2018

Related U.S. Application Data

(60) Provisional application No. 62/377,305, filed on Aug. 19, 2016.

(51) Int. Cl.

| | | |
|---|---|---|
| *A47F 9/04* | (2006.01) | |
| *F24F 11/00* | (2018.01) | |
| *F24F 12/00* | (2006.01) | |
| *G06Q 20/20* | (2012.01) | |
| *F24F 11/30* | (2018.01) | |
| *F24F 11/62* | (2018.01) | |
| *G07G 1/00* | (2006.01) | |
| *G07F 9/10* | (2006.01) | |
| *F24F 11/65* | (2018.01) | |

(52) U.S. Cl.
CPC ............ *A47F 9/048* (2013.01); *A47F 9/04* (2013.01); *F24F 11/0001* (2013.01); *F24F 11/30* (2018.01); *F24F 11/62* (2018.01); *F24F 12/006* (2013.01); *G06Q 20/20* (2013.01); *G06Q 20/204* (2013.01); *G06Q 20/208* (2013.01); *G06Q 20/209* (2013.01); *G07F 9/105* (2013.01); *G07G 1/0018* (2013.01); *F24F 11/65* (2018.01); *F24F 2011/0006* (2013.01)

(58) Field of Classification Search
None
See application file for complete search history.

(56) References Cited

U.S. PATENT DOCUMENTS

| | | |
|---|---|---|
| 3,075,616 A | 1/1963 | Shofiner |
| D258,783 S | 4/1981 | Frederick |

(Continued)

FOREIGN PATENT DOCUMENTS

CN 201401030 Y 2/2010

OTHER PUBLICATIONS

Non-Final Office Action in U.S. Appl. No. 29/574,947 dated Oct. 29, 2018; 9 pages.

(Continued)

*Primary Examiner* — Paul Danneman
(74) *Attorney, Agent, or Firm* — Schmeiser, Olsen & Watts LLP; Timothy P. Collins

(57) ABSTRACT

A self-checkout system comprises a cabinet housing, the cabinet including a ventilated region; a point of sale (POS) station at the cabinet housing, the POS station including heat-generating components, the ventilated region of the cabinet housing removing heat generated from the POS components from the cabinet housing; and an air flow system at an interior of the cabinet housing that outputs air through the ventilated region.

13 Claims, 5 Drawing Sheets

(56) References Cited

U.S. PATENT DOCUMENTS

| | | | |
|---|---|---|---|
| D283,181 | S | 4/1986 | McMillion |
| 6,550,583 | B1 | 4/2003 | Brenhouse |
| 6,889,752 | B2 | 5/2005 | Stoller |
| 7,745,961 | B2 | 6/2010 | Kato |
| 8,924,258 | B2 | 12/2014 | Knoll et al. |
| 2003/0222092 | A1 | 12/2003 | Sherrod |
| 2004/0050626 | A1 | 3/2004 | Lantz et al. |
| 2007/0240966 | A1* | 10/2007 | Tabachnik ............... G07D 1/02 194/206 |
| 2007/0274036 | A1 | 11/2007 | Walsh et al. |
| 2012/0187195 | A1 | 7/2012 | Actis et al. |
| 2017/0354274 | A1 | 12/2017 | Bacallao |
| 2017/0355531 | A1 | 12/2017 | Bacallao et al. |
| 2018/0049565 | A1 | 2/2018 | Bacallao |

OTHER PUBLICATIONS

"Fact Sheet: Fujitsu U-Scan(R) Genesis(R) II Self-Checkout," Fujitsu America, Inc., Solutions.us.fujitsu.com, 2015.

"Self Checkout Systems," Shekel Electronic Scales Ltd., HelloTrade.com/Shekel-scales, accessed Aug. 3, 2016.

"Utopia Carousel Solution," UtopiaSelfScan.com, accessed Aug. 3, 2016.

"Supermarket Checkout Lanes," Pan-Oston, PanOston.com, accessed Aug. 3, 2016.

"Toshiba Self Checkout System 6," Toshiba Global Commerce Solutions, Inc., 2014.

Smith, James E., "IBM Introduces Retail's First Completely Modular Self-Checkout System," Jan. 11, 2011, IBM News Room, IBM.com.

Examiner's Report in Canadian Design Application No. 172722, dated May 12, 2017; 2 pages.

Bacallao, et al. "Self-Checkout Register Configurations," U.S. Appl. No. 62/349,940, filed Jun. 14, 2016; 15 pages.

Bacallao, et al. "Self-Checkout Register Configurations," U.S. Appl. No. 15/622,136, filed Jun. 14, 2017; 24 pages.

Bacallao, et al. "Waste Collection System and Method," U.S. Appl. No. 62/295,866, filed Feb. 16, 2016; 16 pages.

Bacallao, et al. "Waste Collection System and Method," U.S. Appl. No. 15/425,287, filed Feb. 6, 2017; 16 pages.

Bacallao, Yurgis. "Modular Bagging Stations," U.S. Appl. No. 62/349,933, filed Jun. 14, 2016; 19 pages.

Bacallao, Yurgis. "Modular Bagging Stations," U.S. Appl. No. 15/622,146, filed Jun. 14, 2017; 19 pages.

International Preliminary Report on Patentability in PCT/US2017/046860 dated Feb. 28, 2019; 8 pages.

Ex Parte Quayle Action in U.S. Appl. No. 29/574,947 mailed on Aug. 15, 2017; 5 pages.

Restriction Requirement in U.S. Appl. No. 29/574,947 dated Aug. 30, 2018; 5 pages.

Panostonusa, "Pan Oston NRF Video 2014," Youtube.com, Feb. 5, 2014.

International Search Report & Written Opinion in International Patent Application No. PCT/US17/46860, dated Oct. 30, 2017; 9 pages.

Notice of Allowance in U.S. Appl. No. 29/574,947 dated Jun. 14, 2019; 7 pages.

* cited by examiner

SELF-CHECKOUT STATION AIR CIRCULATION

RELATED APPLICATIONS

This application claims the benefit of U.S. Provisional Patent No. 62/377,305, filed Aug. 19, 2016, entitled "Self-Checkout Station Air Circulation," the contents of which are incorporated by reference herein in their entirety. This application is related to Design Patent application Ser. No. 29/574,947, filed Aug. 19, 2016, entitled "Self-Checkout Station," the contents of which are incorporated by reference herein in their entirety.

BACKGROUND OF THE INVENTION

Technical Field

The present inventive concepts relate to self-checkout systems and, more specifically, to air flow configurations for cooling a self-checkout system.

State of the Art

Self-checkout stations at a retail store permit customers to process their store purchases as an alternative to a cashier-staffed checkout counter.

SUMMARY

In one aspect, provided is a self-checkout system, comprising: a cabinet housing, the cabinet including a ventilated region; a point of sale (POS) station at the cabinet housing, the POS station including heat-generating components, the ventilated region of the cabinet housing removing heat generated from the heat-generating components from the cabinet housing; and an air flow system at an interior of the cabinet housing that outputs air through the ventilated region. The air flow system included a perforated region at one side of the cabinet housing for exchanging the air with an ambient environment and for providing an air flow path for removing the heat between the ventilated region, the perforated region, and the ambient environment.

In some embodiments, the cabinet housing includes a sidewall, and wherein the sidewall includes a plurality of vents of the ventilated region. The air flow system includes both the vents and the perforated region.

In some embodiments, the sidewall is removable and replaceable with a different vent configuration to change the air flow system.

In some embodiments, the cabinet housing includes a door that exposes the interior of the cabinet housing when in an open state, and wherein the door includes a plurality of vents of the ventilated region.

In some embodiments, the air flow system comprises a plurality of electric fans that circulate the air in the interior of the cabinet housing and through the ventilated region.

In some embodiments, the electric fans are proximal the ventilated region.

In some embodiments, the ventilated region includes a sidewall of the cabinet, and wherein the electric fans are coupled to the sidewall.

In some embodiments, the self-checkout system further comprises a recyclable collection system in the housing adjacent the ventilated region.

In some embodiments, the cabinet housing is under and supports at least one of a register area, a belt system, a self-checkout scale platform, or a pay area system.

In some embodiments, the self-checkout system further comprises a bagging station adjacent the cabinet housing, the bagging station including: a carousel top; a center piece; and a plurality of bag holding elements extending from the center piece.

In another aspect, a self-checkout system at a host pay-station area of a store comprises an itemization station including a point of sale system; a bagging station on one side of the itemization station; a ventilated region upstream and an air flow system on an opposite side of the itemization station as the bagging station that outputs heated air from the itemization station; and an air flow system including a perforated region at one side of the cabinet housing for exchanging the air with an ambient environment and for providing an air flow path for removing the heat between the ventilated region, the perforated region, and the ambient environment.

In some embodiments, the air flow system forms a heat transfer path from the itemization station to the ventilated region at the register belt station.

In another aspect, a self-checkout system comprises a ventilation system comprising a first set of ventilation openings in a door of a checkout system housing and a second set of ventilation openings in a sidewall of the checkout system housing; and an air flow system that forms a heat transfer path from the first set of ventilation openings to the second set of ventilation openings.

In some embodiments, wherein the air flow system comprises a plurality of electric fans that circulate the air in the interior of the housing and through the ventilated region.

In some embodiments, a bottom region of the housing includes heat-generating devices, and the second set of ventilation openings is at a mid-section of the sidewall of the checkout system housing for removing heated air generated by the heat-generating device from the housing.

DETAILED DESCRIPTION OF EMBODIMENTS OF THE INVENTION

Figure 1:
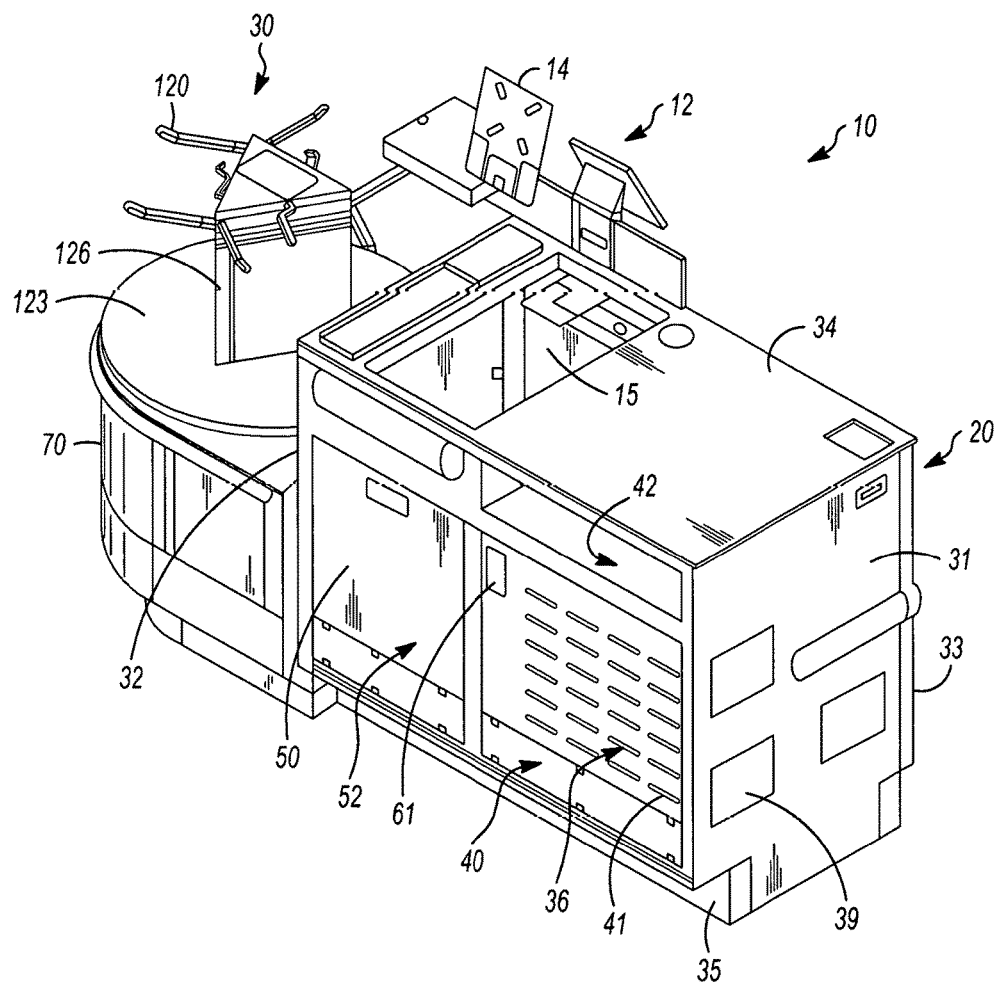
FIG. 1 shows a perspective view of a self-checkout system, in accordance with some embodiments.

FIG. 1 shows a perspective view of a self-checkout system 10, in accordance with some embodiments. In some embodiments, for example, as shown in FIG. 1, a self-checkout system 10 includes a cabinet housing 20, an itemization station 12, also referred to as a point of sale (POS) station, at the cabinet housing 20, and a bagging station 30 adjacent the cabinet housing 20. The self-checkout system 10 may include other elements, for example, described with reference to U.S. Provisional Patent Application No. 62/349,940 filed Jun. 14, 2016 and entitled "Self-Checkout Register Configurations," and U.S. patent application Ser. No. 15/622,136 filed Jun. 14, 2017 and entitled "Self-Checkout Register Configurations," the contents of each of which are incorporated by reference herein in their entirety.

The cabinet housing 20 may be a single housing 20. For example, the housing 20 may include a metal frame to which sidewalls 31, 32, back wall 33, top 34, and/or bottom 35 may be attached. Alternatively, the housing 20 may be formed of multiple units coupled together to form a single housing 20. Here, the multiple units include an air flow pathway or otherwise uninterrupted path therebetween to allow the exchange of airflow, cables, and/or other elements between the contents in the enclosures of the multiple units. This may be part of an air flow system at an interior of the cabinet housing that outputs air through a ventilated region, described herein.

Figure 3:
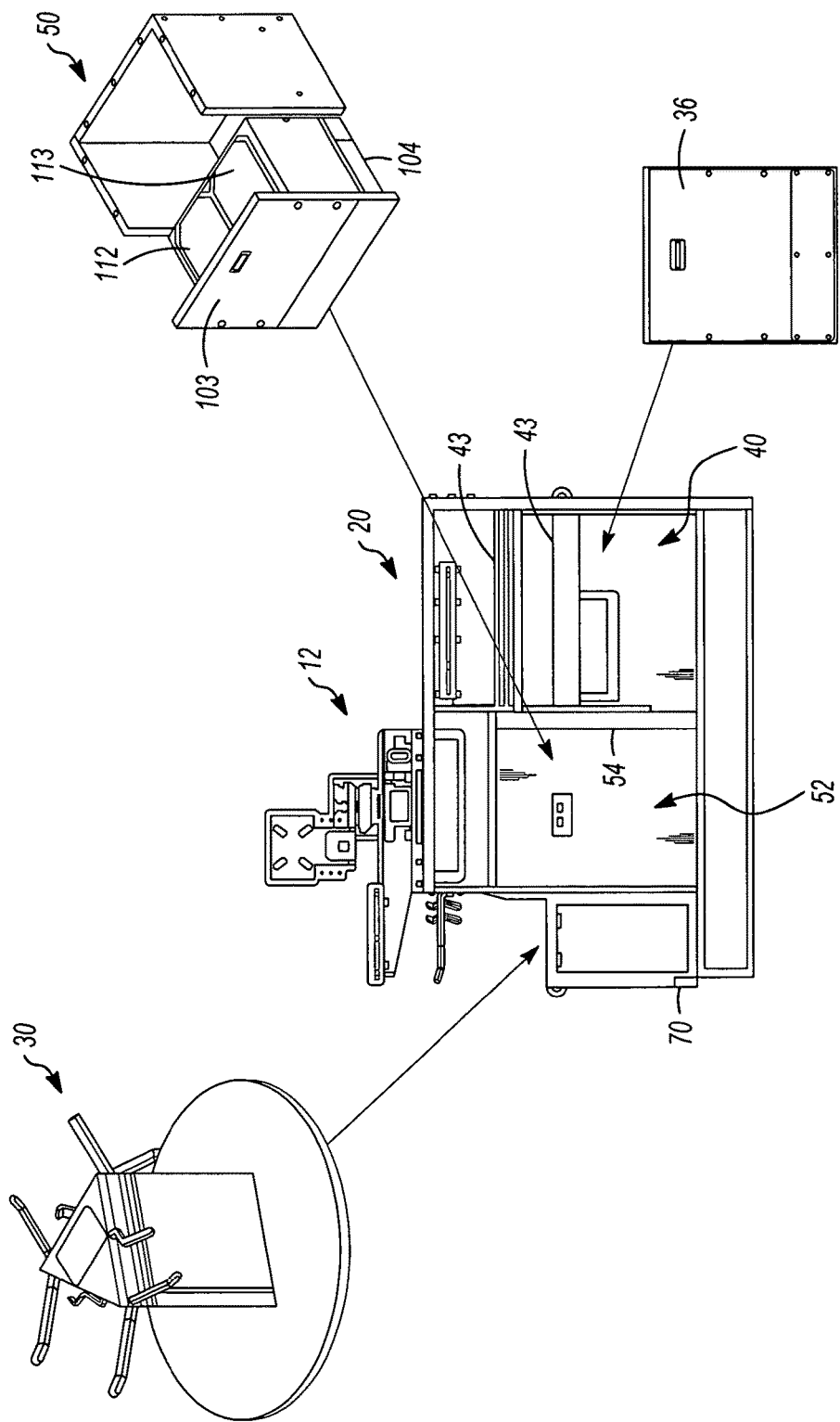
FIG. 3 is an exploded view of the self-checkout system of FIG. 2.
Figure 4:
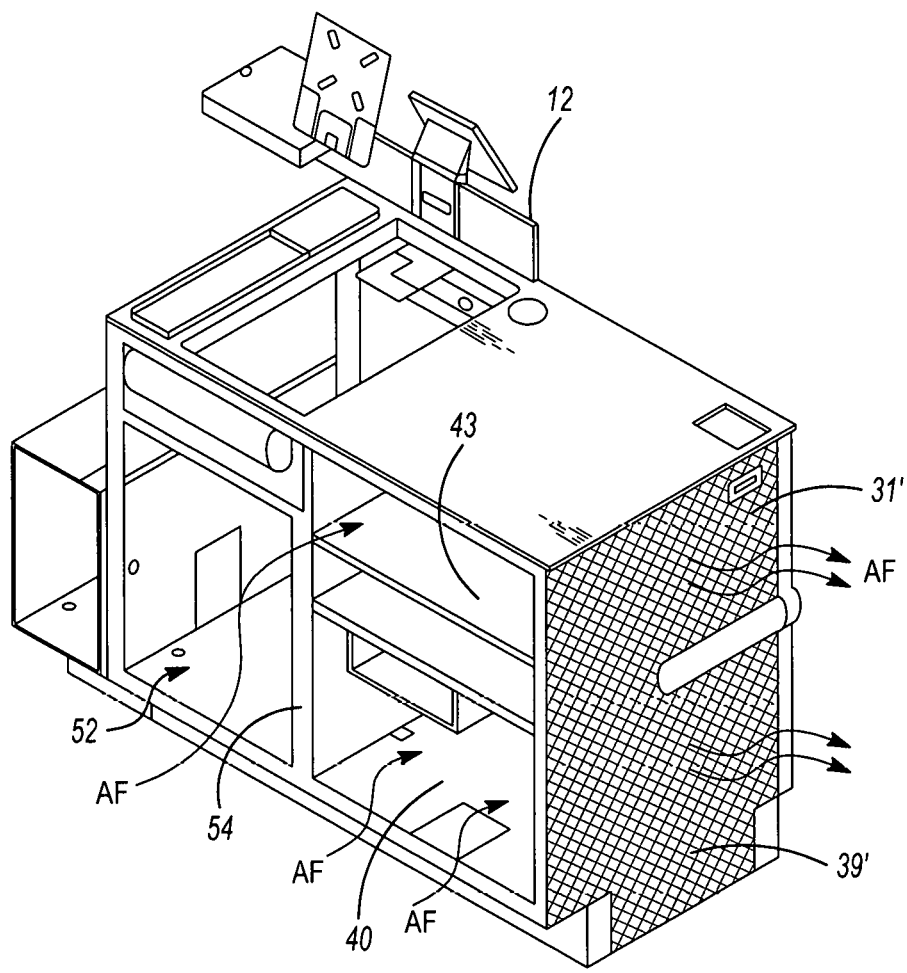
FIG. 4 is a view of an interior of a self-checkout system, and illustrating air flows through the self-checkout system, in accordance with some embodiments.

The cabinet housing 20 may include a first region 40 and a second region 52. As shown in FIGS. 3 and 4, the cabinet housing 20 may include a dividing wall 54 that separates the first region 40 from the second region 52. The first region 40 may have one or more shelves 43 or other storage space, for example, for a cash drawer 42. The first region 40 may include electronic components, point of sale (POS) computers, power supplies, connectivity components, electronic article surveillance, checkpoint security devices, and/or other equipment used as part of an operation performed at the self-checkout station. The second region 52 includes an opening under a POS system or other element of an itemization station 12 for receiving a garbage collection system 50 or other assembly. In some embodiments, only heat-generating components of the electronic components, point of sale (POS) computers, power supplies, connectivity components, electronic article surveillance, checkpoint security devices, and/or other equipment is co-located in the first region 40, the second region 52, or other common region of the cabinet housing, and wherein an air flow path produced by an air flow system removes the heat from the common region of the cabinet housing.

A door 36 is positioned at the first region 40, more specifically, at an opening to the interior of the first region 40 of the housing 20. The door 36 exposes the interior of the first region 40 of the cabinet housing 20 when in an open state. The door 36 may include a handle 61 for opening and/or closing the door 36. In some embodiments, as shown in FIG. 1, the handle 61 is at a periphery of the door 36. In other embodiments, as shown in the station 10' of FIG. 2, a handle 61' is at a center region of a door 36'. The door 36, 36' (generally, 36) may open and close according to a hinge at a corner of the door 36, or the door 36 may be part of an assembly, and may slide along rails for opening and closing. At least a portion of the door 36 may include a layer or coating of material, such as metal, plastic, or chemical compound, for example, providing a scratch or damage-resistant guard.

A garbage collection system 50 may be positioned at the second region 52 of the opening of the housing 20. Although a garbage collection system is referred to, the system 50 can collect recyclable items such as coat hangers, plastics, metals, cardboard, bottles, cans, and so on. In some embodiments, the garbage collection system 50 is the same or similar to a garbage collection system described at U.S. Provisional Patent Application No. 62/295,866 filed Feb. 16, 2016 entitled "Waste Collection System and Method," the contents of which are incorporated by reference herein in their entirety. For example, the garbage collection system 50 may include a set of rails 104, ball bearing slides, or the like, for permitting one or more garbage bins 112, 113 and door 103 to slide linearly relative to the interior of the second region 52 in the housing 20. The garbage collection system 50 can be constructed and arranged for one or more of garbage collection, recyclable collection, hangers collection, returns collection (for example, bottles, cans, and so on), or anything else having a size and configuration for insertion into one or both bins 112, 113. The air flow system, including air flow paths, air or circulation-producing elements such as fans or the like, and ventilated or perforated panels, doors, or the like, may operate to remove heat from the housing 20 regardless of the presence of the garbage collection system 50. For example, as described herein, a different vent configuration may be implemented to change the air flow system due to the presence of the garbage collection system 50 in the housing 20.

The cabinet housing 20 may be under and provide structural or other support at least one of an itemization station 12, and/or related register area, a self-checkout scale platform, or a pay area system. The cabinet housing 20 may be formed of one or more materials sufficient for receiving and supporting the weight of the itemization station 12, the garbage collection system 50, and the contents of the interior of the housing 20, for example, wood, metal, plastic or related composites, or a combination thereof.

The itemization station 12 can include a scanning device for scanning items, for example, scanning barcodes, universal product code (UPC) and so on that are identified with the item to be purchased.

The itemization station 12 may also include a product scale 15 in communication with the scanner. The product scale 15 may be used to determine the weight of the item. The scale 15 may be integrally connected with, or independent from and in electronic communication with, an identification-code reader, such as an optical-code reader, laser scanner, a radio frequency identification (RFID) tag reader, or any other type of machine code reader, which can decode a indicia or tag on a store item for purchase. In use, the identification-code reader identifies an item in the store by decoding an item code associated with the item. An item code signal is then communicated to a store computer (not shown) for processing. Similar to the abovementioned example, a different vent configuration may be implemented to change the air flow system due to the presence or absence of the product scale 15 and/or other heat-generating components in the housing 20. In doing so, the air flow path produced by the air flow system may deviate, redirect, or otherwise accommodate for the presence or absence of the product scale 15 and/or other heat-generating components in the housing 20. For example, a different door or side panel may include vents when the product scale 15 is present, but may not include such vents when the product scale 15 is not part of the itemization station 12 in the cabinet housing 20.

In addition to the product scale 15 and scanning device, the itemization station 12 may include, but not be limited to, an interactive customer interface terminal or public view monitor 14 electrically coupled to the scanner, an electronic payment terminal, credit card, bill, and/or coin detector and processor, printer, receipt generator, item sensors, point of sale (POS) terminal or related computer having a display, processor, memory, input/output devices, storage device, scanner, printer, electronic payment processing device, cash tray, and credit card reader or related processing module, and so on.

In some embodiments, the bagging station 30 may be similar to or the same as U.S. Provisional Patent Application No. 62/349,933 filed Jun. 14, 2016 entitled "Modular Bagging Stations," the contents of which are incorporated by reference herein in their entirety. The bagging station 30, for example, may a rotatable carousel top 123, a center piece 126, and a plurality of bag holding elements 120 extending from the center piece 126. The carousel top 123 may be positioned on a collection system base 70, for example, shown in FIGS. 2-3B. Carousel top 123 may hold center piece 126, and is constructed and arranged to support one or more bags, for example, paper shopping bags, while a bag is being filled with store items for purchase. In some embodiments, the collection system base 70 may be integral with and part of the housing 20. In other embodiments, as shown, the collection system base 70 is separate from the housing 20, and coupled to a sidewall of the second region 52 of the housing 20. The collection system base 70 may include an interior for housing miscellaneous components, such as wires from the public view monitor 14, scale 15, or other electronic accessories of the itemization station 12.

In some embodiments, the carousel top 123 may rotate due to a bearing plate (not shown) or the like that permits the carousel top 123 to rotate relative to the stationary base 70. The bag holding elements 120 may include hooks, rods, clamps, spring clips or other extensions for holding a shopping bag and its contents. A shopping bag may be paper, plastic, recyclable material, and/or other well-known material. The elements 120 may include bag upper edge holders that grasp the upper edge of an open bag in order to hold the bag open and in place while items are placed in the bag so the bag can be filled. The bag holding elements 120 and/or bag edge holders may be of various sizes and shapes for supporting the weight of a shopping bag filled with store items. In some embodiments, the bag holding elements 120 may be removable, for example, removed from the top portion of the center piece 126 and replaced with different the bag holding elements.

As previously described, the housing 20 includes heat generating components, e.g., electrical equipment and the like, in particular, located in at least one of the first region 40 and the second region 52 of the housing 20. The self-checkout system 10 includes an air flow system that includes one or more vented regions for controlling an amount and/or direction of air heated by the components in the housing 20. For example, as shown in FIG. 4, the air flow system forms a heat transfer path illustrated by air flow arrows (AF) from the itemization station 12 to the ventilated region at the housing 20. For example, the air flow system is constructed and arranged to receive a flow of air via the vents 41 in the door 36 and output a flow of heated air through one or more vents 39 in a sidewall 31 of the housing 30, or vice versa where the air flow system is constructed and arranged to receive a flow of air via the sidewall vents 39 and output a flow of heated air through the door vents 41. This configuration where vents are located at two different regions of the housing 20 obviate the need for air to enter and leave the same vent region, for example, where the sidewall has vents but not the door. In some embodiments, as shown in FIG. 1, the vents 39 in the sidewall 31 are arranged as vent regions. In other embodiments, as shown in FIG. 4, the sidewall 31 includes a plurality of perforations, slots, perforations, or related ventilation openings for allowing the release of heated air. The sidewall 31 is opposite sidewall 32 at which the bagging station 30 abuts. In some embodiments, the vented region of the housing 20 includes some or all of the first region 40 of the housing 20.

In some embodiments, an air flow path, or heat transfer path, may extend between shelves 43, for example, shown in FIG. 4. Heat-generating components at a bottom of the housing 20 may generate heat that rises toward a top region of the housing 20. Ventilation openings in a vent region 39' along a height of the housing sidewall 31' may permit the heated air to be removed from the housing above, below, and/or between the shelves 43.

Figure 2:
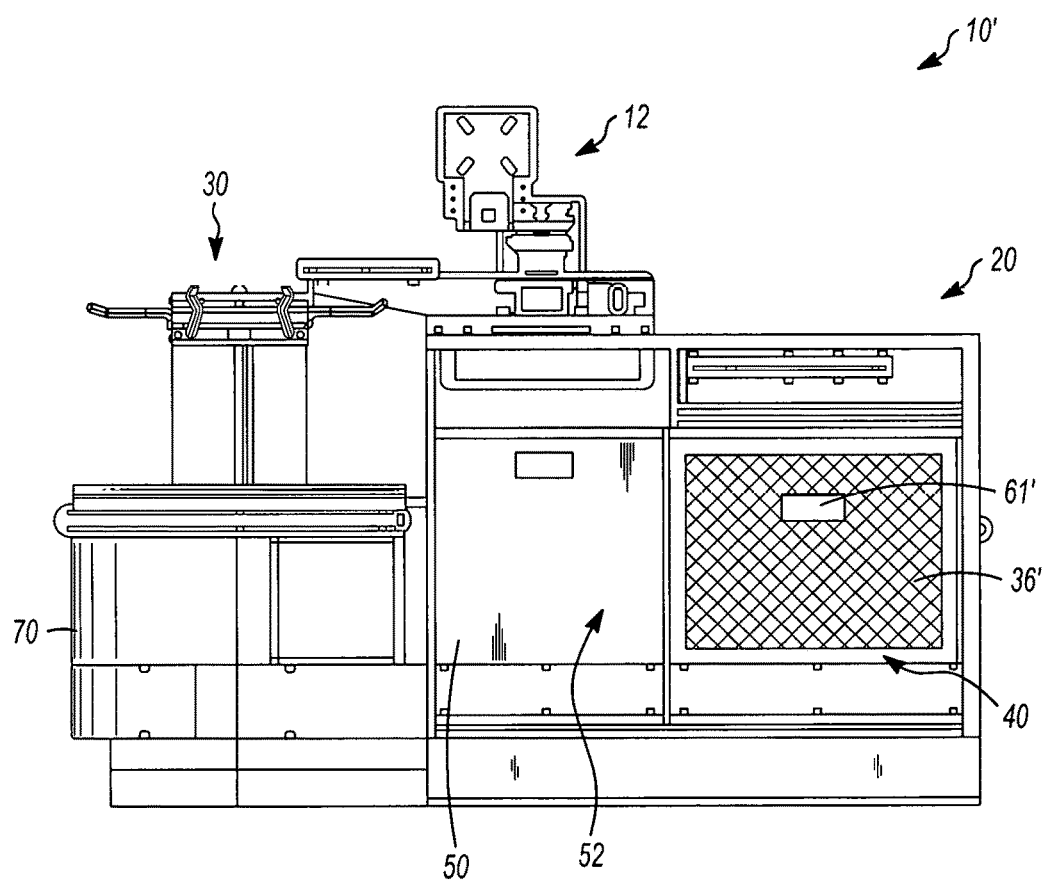
FIG. 2 is a front view of a self-checkout system, in accordance with other embodiments.

In some embodiments, as shown in FIG. 1, the door 36 of the housing 20 includes at least one vent 41. In other embodiments, as shown in FIG. 2, a door 36' may include a plurality of perforations. In some embodiments, both the sidewall 31 and the door 36 each includes at least one vent 39, 41, respectively. Here, a flow of heated air is output through both sets of vents 39, 41. The configuration of the vents 39, 41 may be to provide a varied airflow through the interior of the housing 20 and the sidewall 31 and/or door 36. In some embodiments, the door 36, 36' (generally, 36) may include one or more vents 41, or vent regions, configured in a same or similar manner as the cabinet housing 20, for example, housing sidewall 31. In other embodiments, the size, shape, and/or number of vents 41 in the door 36 is different than the vents 39 in the housing sidewall 31. For example, the vents 39 in the sidewall may be configured for communicating with electric fans coupled thereto for forming an air flow path from the interior of the housing 20 to the ambient environment external to the housing 20.

In some embodiments, the sidewall 31 and/or door 36 is removable and replaceable with a sidewall and/or door having a different vent configuration. In other embodiments, the sidewall 31 and/or door 36 may have regions, or openings, in which vent modules (not shown) may be inserted, removed, and/or replaced, referred to as "plug-and-play" vent sections or regions. For example, the door 36 shown in FIG. 1, or a vent section in the door 36, may be removed and replaced with the door 36' shown in FIG. 2, or a different "plug-and-play" vent region, in order to change the air flow system. Similarly the sidewall 31 having the three vent regions 39 in FIG. 1 may be replaced with a sidewall 31' having a single larger vent region 39' shown in FIG. 4 for changing the air flow system. The air flow system may be changed in this manner to accommodate for changes in temperature inside the housing 20 caused by heat-generating equipment. For example, the self-checkout system 10 may be modified to include a bagging station carousel that rotates automatically (instead of manually), which requires a power supply located in the housing 20 as well as wiring extending from the power supply in the housing to the bagging station 30. The addition of the power supply may require an increase in air flow through the housing 20, which can be achieved by a different door 36 and/or side wall 31.

Figure 5:
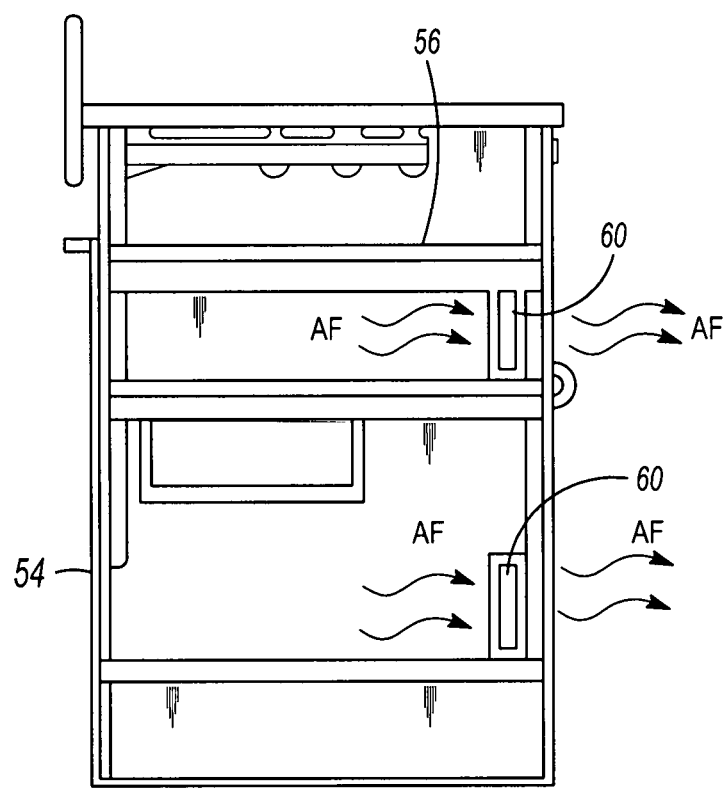
FIG. 5 is a side view of an interior of a self-checkout system having electric fans, and illustrating air flows through the self-checkout system, in accordance with some embodiments.

As shown in FIG. 5, the air flow system may comprise one or more electric fans 60, or blowers, that circulate the air, shown by air flow arrows (AF) through the interior of the cabinet housing 20 to a ventilated region, and more specifically, the vents 39 of the sidewall and/or vents 41 of the door 36. The fans 60 may draw power from a power source, for example, power supply via an electric outlet, batteries, and so on, which are located at one region of the housing 20. Here, the power source of the fans 60 may contribute to the heat output inside the housing 20 and therefore the generated heat is removed in a similar manner as other components inside the housing 20 in accordance with embodiments of the present inventive concepts. Alternatively, the fans 60 may rely on solar panels or other alternative energy source for powering the fans 60. The fans 60, or blowers, provide control over the flow of exhausting heated air. The flow of cooling air may flow from the front of the housing 20, e.g., where the door 36 is located, through the housing interior where the air is heated by the power supplies, electronics, and so on in the housing 20, and exits through the vents 39 in the housing sidewall 31. The housing 20 is configured, for example, divided into regions as described with reference to FIGS. 3 and 4, to allow for maximum cooling.

To achieve maximum cooling, in some embodiments, the electric fans 60 are proximal the ventilated region, or are coupled to the inside of the sidewall 31 of the housing 20. Alternatively, or in addition, the electric fans 60 are positioned in the interior of the housing 20 at locations that permit the formation of a circulating air path, or heat transfer path, from heat-generating components in the interior of the housing 20 to the vents 39 and/or 41. For example, this configuration permits the positioning of two electric fans 60 in the bottom region of the housing 20 and one fan 60 in top or middle region of the housing 20, each fan 30 positioned over a vent region 39 as shown in FIGS. 1 and 5. The location of the vents 39, 41 are to permit cooling air to be received inside the housing 20 for cooling the interior where heat-generating components are located. For example, batteries, computers, and/or other heat-generating components may be located at or near the bottom region the housing 20. It is well-known that hot air rises. Thus, two vent regions may be at the bottom and one vent region in the mid-section of the sidewall 31 as shown in FIG. 1 to provide maximum cooling based on this configuration. Accordingly, one or more air flow paths are formed, for example, from the door 36 to the housing sidewall 31, or vice versa, to remove hot air from the housing interior in view of such configurations and locations of heat-generating equipment.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

What is claimed is:

1. A self-checkout system, comprising:
    a cabinet housing, the cabinet including a ventilated region;
    a point of sale (POS) station at the cabinet housing, the POS station including heat-generating components, the ventilated region of the cabinet housing removing heat generated from the heat-generating components from the cabinet housing; and
    an air flow system at an interior of the cabinet housing that outputs air through the vents of a ventilated region, the air flow system including a reconfigurable perforated region at one side of the cabinet housing for exchanging the air with an ambient environment and for providing an air flow path for removing the heat between the ventilated region, the perforated region, into the ambient environment.

2. The self-checkout system of claim 1, wherein the cabinet housing includes a sidewall, and wherein the sidewall includes a plurality of vents of the ventilated region, and wherein the air flow system includes both the vents and the perforated region.

3. The self-checkout system of claim 2, wherein the sidewall is removable and replaceable with a different vent configuration to change the air flow system.

4. The self-checkout system of claim 1, wherein the cabinet housing includes a door that exposes the interior of the cabinet housing when in an open state, and wherein the door includes a plurality of vents of the ventilated region.

5. The self-checkout system of claim 1, wherein the air flow system comprises a plurality of electric fans that circulate the air in the interior of the cabinet housing and through the ventilated region.

6. The self-checkout system of claim 5, wherein the electric fans are proximal the ventilated region.

7. The self-checkout system of claim 6, wherein the ventilated region includes a sidewall of the cabinet, and wherein the electric fans are coupled to the sidewall.

8. The self-checkout system of claim 1, further comprising a recyclable collection system in the housing adjacent the ventilated region.

9. The self-checkout system of claim 1, wherein the cabinet housing is under and supports at least one of a register area, a belt system, a self-checkout scale platform, or a pay area system.

10. The self-checkout system of claim 1, further comprising a bagging station adjacent the cabinet housing, the bagging station including:
    a carousel top;
    a center piece; and
    a plurality of bag holding elements extending from the center piece.

11. A self-checkout system, comprising:
    a ventilation system comprising a first set of ventilation openings in a door of a checkout system housing and a second set of ventilation openings in a sidewall of the checkout system housing; and
    an air flow system that forms a heat transfer path from the first set of ventilation openings to the second set of ventilation openings.

12. The self-checkout system of claim 11, wherein the air flow system comprises a plurality of electric fans that circulate the air in the interior of the housing and through the ventilated region.

13. The self-checkout system of claim 11, wherein a bottom region of the housing includes heat-generating devices, and wherein the second set of ventilation openings is at a mid-section of the sidewall of the checkout system housing for removing heated air generated by the heat-generating device from the housing.

* * * * *